United States Patent [19]

Stevens

[11] 4,146,120
[45] Mar. 27, 1979

[54] TRANSMISSION CONTROL ASSEMBLY

[75] Inventor: W. Gene Stevens, Dunlap, Ill.

[73] Assignee: Caterpillar Tractor Co., Peoria, Ill.

[21] Appl. No.: 831,027

[22] Filed: Sep. 6, 1977

[51] Int. Cl.² .................... B60K 41/22; G05G 5/10
[52] U.S. Cl. .............................. 192/3.63; 192/3.57
[58] Field of Search ............... 192/3.57, 3.63; 74/477

[56] References Cited

U.S. PATENT DOCUMENTS

| | | | |
|---|---|---|---|
| 3,011,357 | 12/1961 | Binder | 192/3.63 X |
| 3,229,551 | 1/1966 | Stuckey | 74/745 |
| 3,265,170 | 8/1966 | Olnhausen | 192/3.63 |
| 3,522,867 | 8/1970 | Page et al. | 192/3.63 |
| 3,941,007 | 3/1976 | Webber | 74/340 |

Primary Examiner—Allan D. Herrmann
Attorney, Agent, or Firm—Charles E. Lanchantin, Jr.

[57] ABSTRACT

A transmission control assembly for a transmission having an input clutch movable between an engaged position and a disengaged position, a plurality of gears, a shaft, and a plurality of sliding collars selectively coupling the gears to the shaft, the control assembly including an input clutch control system having a manually operated input clutch control member movable between a first position and a second position for respectively selecting the engaged and disengaged positions of the input clutch, a shift control mechanism for urging one of the sliding collars into an active position connecting one of the gears to the shaft, the shift control mechanism having a manually operated speed control member movable between a plurality of speed positions, and an interlock control system for automatically preventing movement of the speed control member between the speed positions until the input clutch control member is at the second position.

8 Claims, 14 Drawing Figures

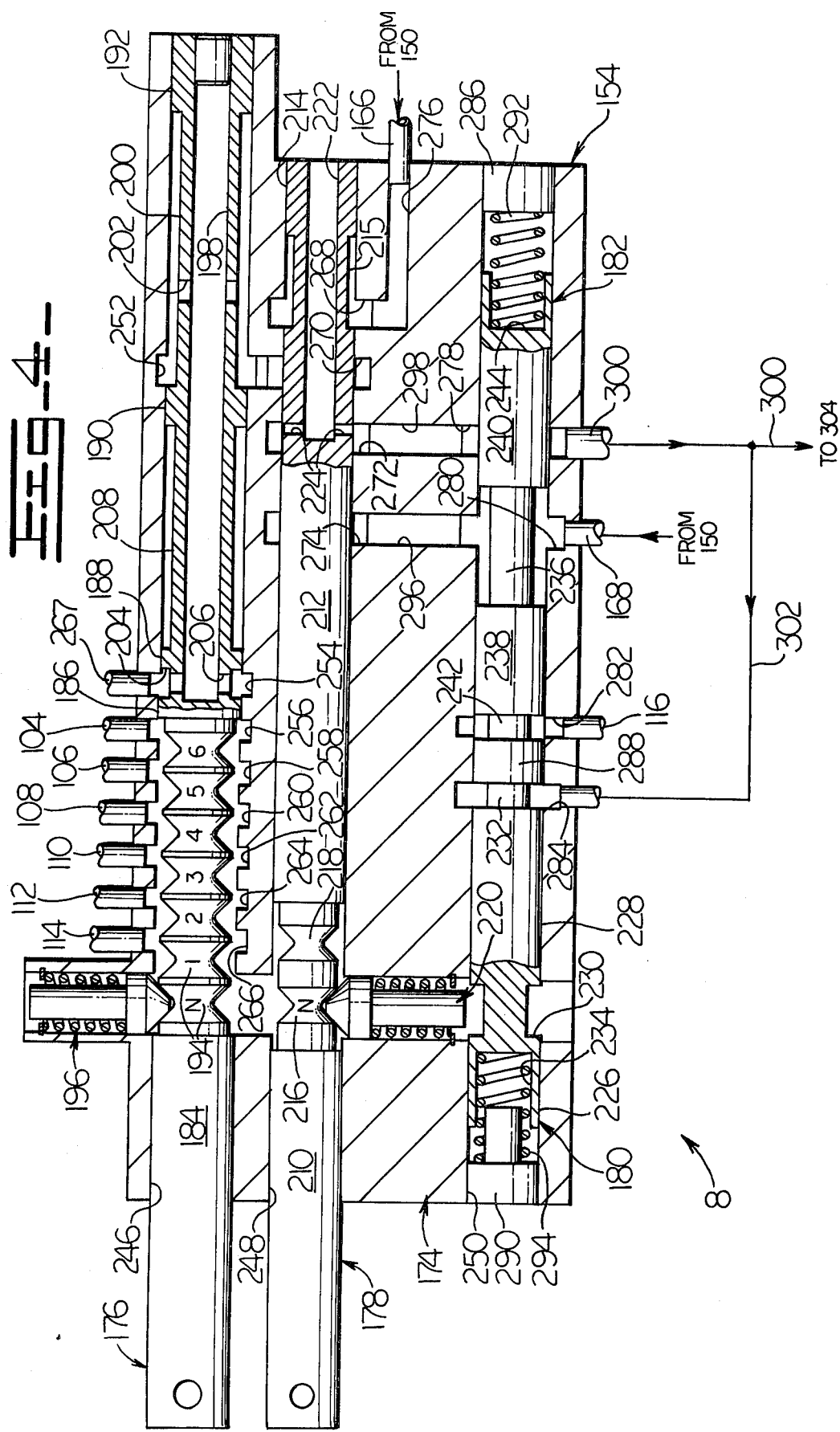

TRANSMISSION CONTROL ASSEMBLY

BACKGROUND OF THE INVENTION

This invention relates generally to a vehicle transmission of the type having constant mesh gearing, and more particularly to a control assembly for effecting positive and timely shifting of the transmission.

Vehicle transmissions having an input clutch, a plurality of parallel shafts, a plurality of intermeshing gears mounted on the shafts, and a plurality of clutch collars for selectively coupling the individual gears and shafts to obtain the desired gear ratio are known. However, prior art control assemblies for such transmissions have been excessively complex and costly in construction because of the need to assure positive and timely engagement of the axially sliding clutch collars with their respectively associated clutch teeth or splines. While these clutch collars have heretofor been shifted by either manually or fluid powered shifter forks, the operator was often able to shift them out of proper phasing with the previously released or disengaged input clutch. This, of course, not only results in excessive clashing of the gear teeth but also the possibility that the respective clutch teeth are not fully engaged upon the variably timed reengagement of the input clutch. Consequently, many of these assemblies have experienced operating failures or have required frequent repair.

In view of the above, it would be advantageous to provide a simple and yet reliable transmission control assembly which would assure full release of the input clutch before allowing movement of the clutch collars and which would sense when a clutch collar is fully engaged into its proper axial position in order to positively provide a proper sequence for reengagement of the input clutch.

SUMMARY OF THE INVENTION

The present invention is directed to overcoming one or more of the problems as set forth above.

According to the present invention this is accomplished by providing a transmission control assembly for a transmission having an input clutch and being movable between an engaged position and a disengaged position, a plurality of gears, a shaft, and a plurality of sliding collars selectively coupling the gears to the shaft, the control assembly including an input clutch control system having a manually operated input clutch control member movable between a first position and a second position for respectively selecting the engaged and disengaged positions of the input clutch, a shift control mechanism for urging one of the sliding collars into an active position connecting one of the gears to the shaft, the shift control mechanism having a manually operated speed control member movable between a plurality of speed positions, and an interlock control system for automatically preventing movement of the speed control member between the speed positions until the input clutch control member is at the second position.

BRIEF DESCRIPTION OF THE DRAWINGS

FIG. 4 is a diagrammatic and enlarged sectionalized view of one of the control systems shown in FIG. 3 showing details of construction of the selector spools and associated valving.

DETAILED DESCRIPTION

Figure 1:
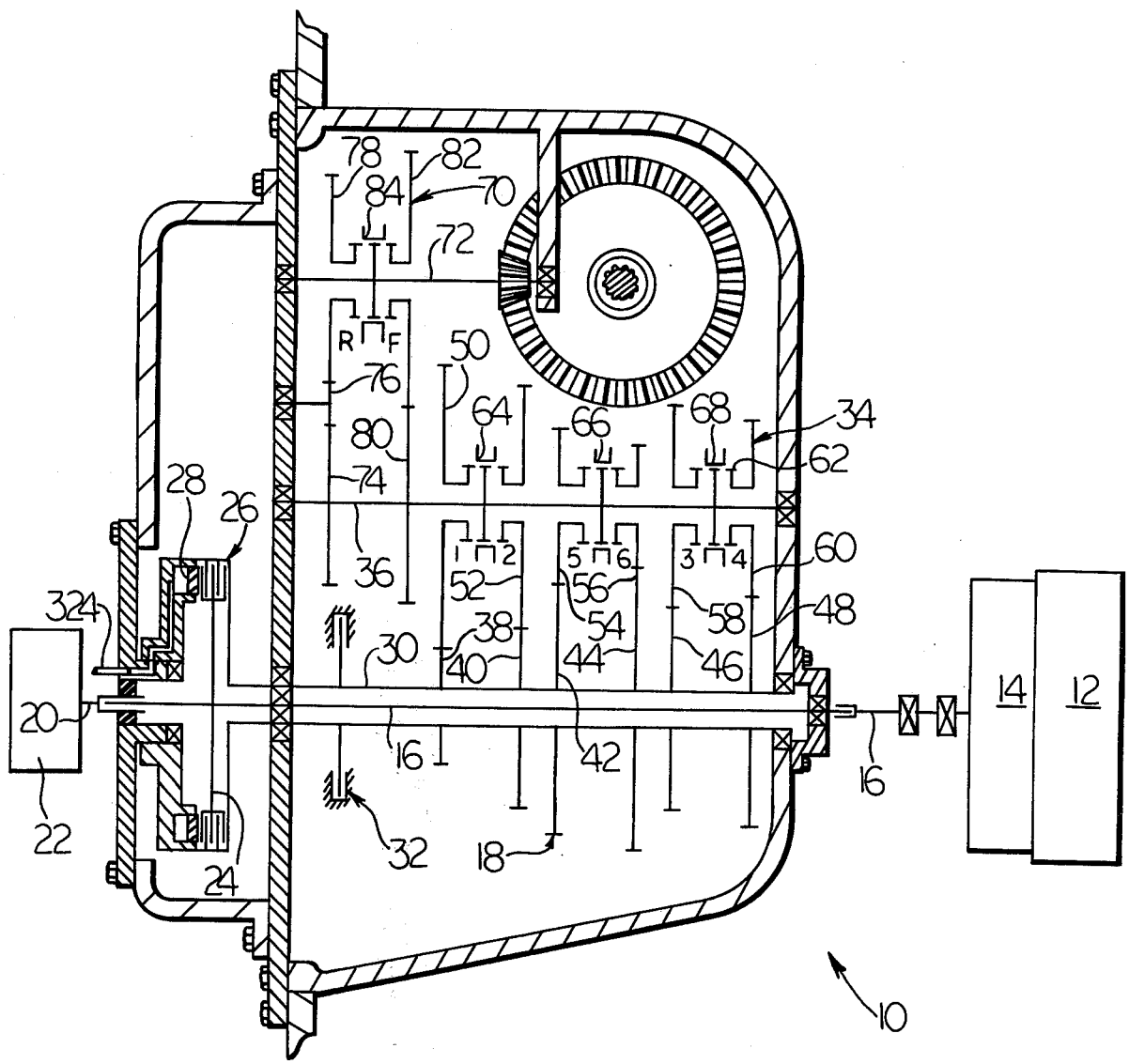
FIG. 1 is a diagrammatic and generally vertical sectionalized view of a constant mesh transmission and associated power train of the type controlled by the transmission control assembly of the present invention.
Figure 2:
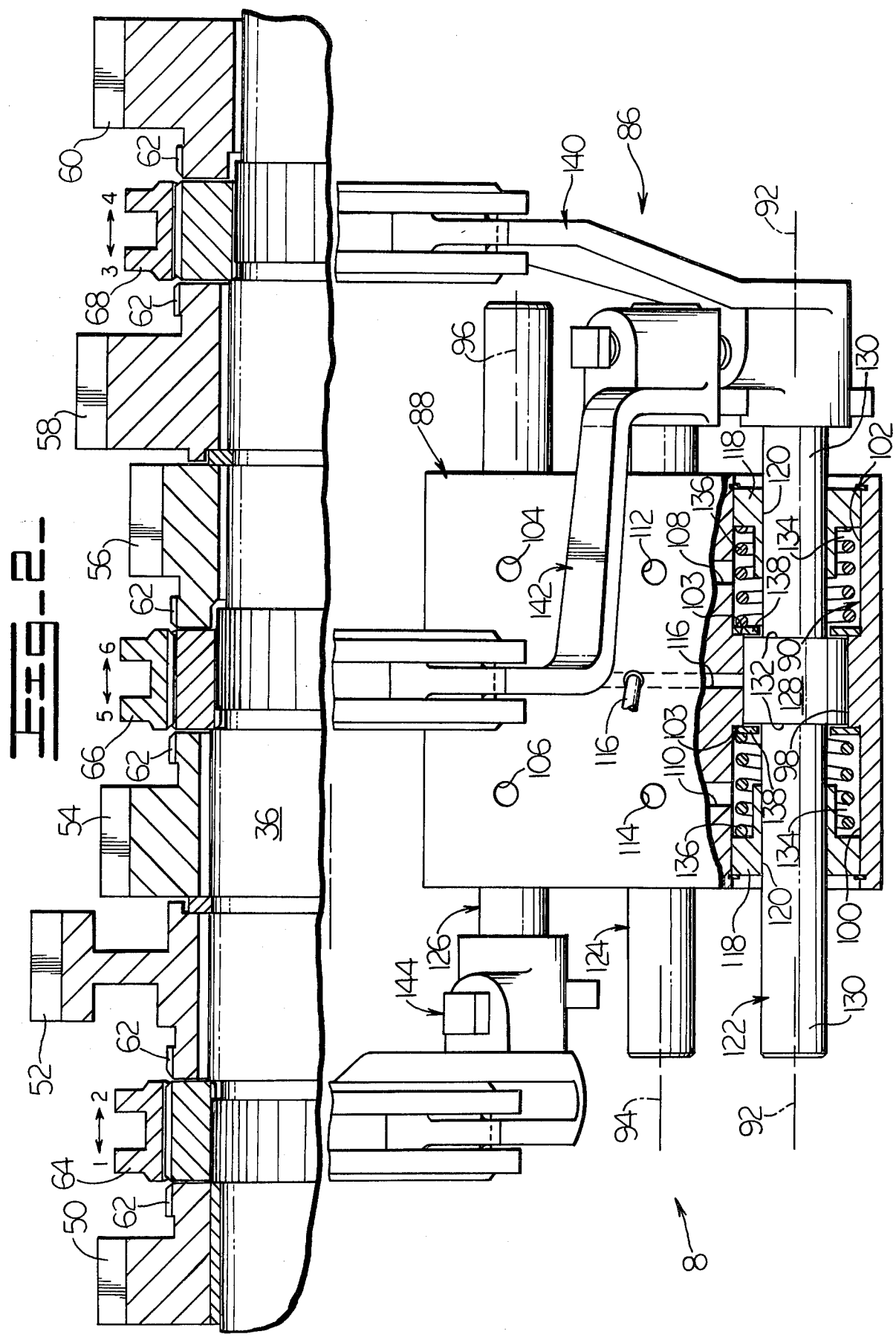
FIG. 2 is an enlarged diagrammatic and partially sectionalized side view of a portion of the transmission illustrated in FIG. 1 along with a shifter mechanism therefor and forming a portion of the transmission control assembly of the present invention.
Figure 3:
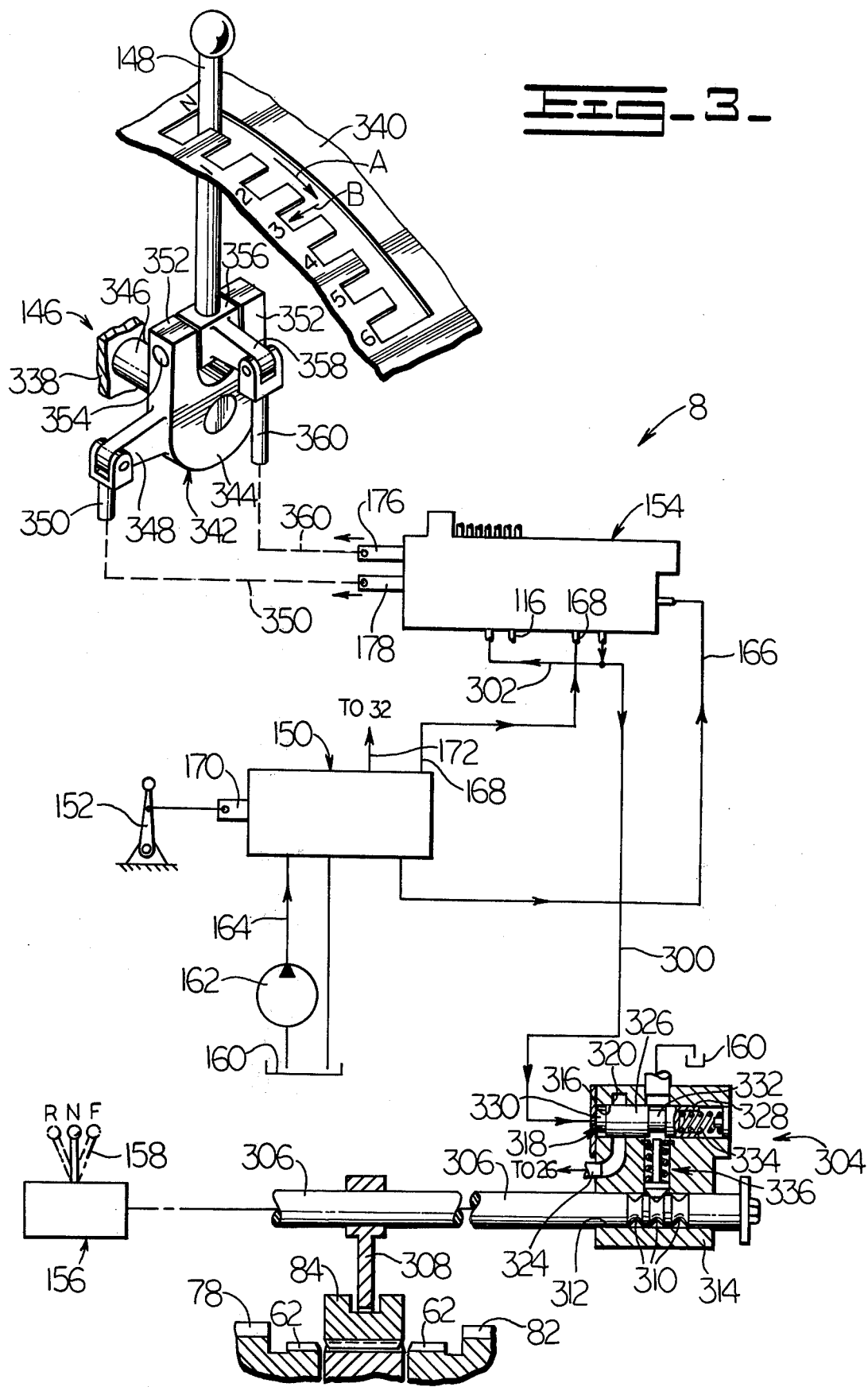
FIG. 3 is a diagrammatic view of the transmission control assembly of the present invention with certain portions broken open to better illustrate details of construction thereof, and which assembly controls the shifter mechanism of FIG. 2.

The transmission control assembly 8 of the present invention and shown in FIGS. 2 through 4 is preferably utilized to control a vehicle power train 10 of the type illustrated in FIG. 1. Such power train includes an engine 12, a flywheel and accessory drive housing 14, and a continuously driven engine output shaft 16 furnishing power to a constant mesh transmission 18. A distal end of the engine output shaft provides a power take-off 20 for driving a winch 22 or similar accessory, and an input member 24 is connected to the shaft for supplying power to a rotating input clutch 26. The input clutch is of conventional construction including a spring retracted and fluid actuated piston 28 which engages an interleaved plurality of annular plates and discs, as diagrammatically illustrated.

Further, the transmission 18 has a tubular transmission input shaft 30 selectively driven by the input clutch 26 when it is in an engaged position and a brake 32 selectively connected to the transmission input shaft. During shifting of the transmission such brake is engaged subsequent to disengagement of the input clutch to facilitate shifting of various elements of the transmission as will later be described.

First gear means 34 are provided in the constant mesh transmission 18 to selectively couple the input shaft 30 with an intermediate shaft 36. Specifically, six input drive gears 38, 40, 42, 44, 46 and 48 are serially secured to the transmission input shaft and are connected in constant mesh relationship with a corresponding number of driven gears 50, 52, 54, 56, 58 and 60 freely rotatably mounted on the intermediate shaft, as shown best in FIG. 2. Each of these driven gears has a coupling spline 62 of the usual type thereon to permit one of the driven gears to be selectively coupled to the intermediate shaft. Such connection is accomplished by axial movement of at least one of three shift collars 64, 66 and 68 which are continuously connected to the intermediate shaft. For example, and as marked in FIG. 2, movement of the shift collar 64 fully to the left when viewing the drawing will directly couple the driven gear 50 to the intermediate shaft to effect a first speed ratio. Alternately, movement of the same shift collar to the right from its centered neutral or disconnected position will couple the driven gear 52 to the intermediate shaft to effect a second speed ratio. Similarly, movement of the second shift collar 66 to the left or right will respectively provide either a fifth or sixth speed ratio, and movement of the third shift collar 68 to the left or right will respectively provide either a third or fourth speed ratio.

Referring again to FIG. 1, second gear means 70 are provided in the transmission 18 to couple the intermediate shaft 36 to an output shaft 72 and to drive the vehicle selectively in forward or reverse. The intermediate shaft has a gear 74 connected thereto which is in constant driving communication with an idler gear 76 and a reverse output gear 78. Another gear 80 is connected to the intermediate shaft adjacent to the gear 74 and is in driving communication with a forward output gear 82. When not in use the reverse and forward output gears are freely rotatably mounted on the output shaft, and are selectively connected thereto by a fourth sliding collar 84 of a construction similar to the previously described speed shifting collars. Axial movement of the collar 84 fully to the left will effect splined coupling of the reverse gear to the output shaft, while movement thereof from its central uncoupled or neutral position to the right will provide coupling of the forward gear thereto.

Having recognized the general details of the transmission 18, attention may now be given to the transmission control assembly 8 of the present invention as shown in FIGS. 2 through 4. Specifically, the control assembly provides for remote and fluid-powered operation of the previously described sliding collars 64, 66, 68 and 84. As shown in FIG. 2, the speed collars 64, 66 and 68 are axially positioned by a shifter mechanism 86. This shifter mechanism includes a valve housing or body 88 containing three cavities 90 of identical construction, only one of which is shown, individually arranged concentrically along a corresponding number of axes 92, 94 and 96 parallel to the axis of the intermediate shaft 36. Each cavity is defined by a centrally located cylindrical bore 98 and a pair of slightly larger diameter cylindrical end bores 100 and 102 symmetrically located on the opposite side of the central bore, thereby defining outwardly facing shoulders 103 in the housing. While six separate control passages 104, 106, 108, 110, 112 and 114 communicate with these end bores, a common branched signal transmitting passage 116 communicates with all of the small bores centrally thereof as representatively illustrated. A pair of stop elements or end walls 118 are individually disposed at the opposite ends of each cavity and each has a cylindrical bore 120 therethrough.

More particularly, the shifter mechanism 86 includes three piston members or pistons generally identified by the reference numerals 122, 124 and 126. The piston illustrated is representative of the identical construction of each, so again only one need be shown. Piston 122 has a central cylindrical body or land 128 axially positioned when in neutral in the central bore 98, a pair of cylindrical rod members 130 symmetrically extending outwardly from the central land and sealingly through the bores 120 in the stop elements 118, and a pair of shoulders 132 formed therebetween. Accordingly, each piston defines with the valve housing 88 and the stop elements a pair of actuating chambers 134 on each side thereof. A positioning spring 136 is disposed in each of these chambers for centering the pistons in the valve housing in the absence of sufficient pressurized fluid in the actuating chambers. Each of these springs is seated on one of the stationary stop elements 118 at one end, and is seated against an annular load bearing plate 138 on the other. The load bearing plates seat against the housing shoulders 103 when the pistons are centered, straddle the central land 128, and one of the plates is displaced axially outwardly by one of the shoulders 132 as the piston is moved away from the central position to thus compress one of the springs. Completing the general construction of the shifter mechanism 86 are three shifter forks 140, 142 and 144 which are connected to the pistons 122, 124 and 126 respectively. These shifter forks nonrotatably engage the normally rotating first, second and third shift collars 64, 66 and 68 for axially coupling one of them to the selected splines 62.

As shown in FIG. 3, the transmission control assembly 8 further includes a speed selector mechanism 146 having a speed selector lever 148, a first hydraulically actuated control system 150 having an input clutch control lever 152, a second hydraulically actuated control system 154 responding to the first control system and to the speed selector mechanism 146, and a mechanically actuated directional control system 156 having a directional selector lever 158.

Referring now to the first control system 150, it has a fluid source or reservoir 160 and a driven pump 162 in communication with the reservoir for supplying fluid to an input conduit 164. Control valve means, not shown, within the first control system receives fluid from the input conduit and supplies it at a preselected fixed pressure; e.g., at 200 psi, to a first supply conduit 166 leading to the second control system 154. The control valve means further supplies fluid to a second supply conduit 168 leading to the second control system at a variable pressure above a preselected minimum value and up to a preselected fixed pressure; e.g., from 40 psi to 200 psi, whenever the transmission input clutch 26 described in connection with FIG. 1 is engaged. Whenever the input clutch is disengaged the second supply conduit 168 is not pressurized or is in open communication with the reservoir 160. In general, the control valve means within the first control system also controls the rate of engagement of the input clutch and the steady state control pressure thereto in response to manual positioning of the input clutch control lever 152 and corresponding movement of a modulating spool 170 connected thereto. Simultaneously, the control valve means responds to movement of the control lever 152 beyond a clutch disengagement position to sequentially engage the brake 32 by supplying pressure to a third supply conduit 172 and to release pressure to the brake upon moving the control lever back into the clutch disengaged or clutch engaged positions.

Referring next to FIG. 4 and to details of construction of the second control system 154, it is evident that it has a valve body or housing 174 adapted to receive four spools, namely a speed selector spool 176, a neutral selector spool 178, an interlock valve spool 180, and a shuttle valve spool 182.

The upper speed selector spool 176 has five cylindrical lands 184, 186, 188, 190 and 192 serially defined along the length thereof and of common diameter. Moreover, a plurality of annular detent notches 194 are formed in the spool, with the notches being adopted to receive a conventional spring loaded detent 196. The spool is shown in a neutral (N) position, with the numerals one through six on the drawing of the spool corresponding to the six different speed positions of the individual alignment with the detent. A central passage 198 within the spool connects to a first annulus 200 located between the lands 190 and 192 via two inlet cross ports 202 and allows fluid flow to a third annulus 204 located between the lands 186 and 188 via two outlet cross ports 206. A second annulus 208 between the lands 188 and 190 is not connected to the central passage.

The neutral selector spool 178 has three spaced apart cylindrical lands 210, 212 and 214 of common diameter, an inlet annulus 215 at the right end, and a pair of juxtaposed annular detent notches 216 and 218 at the left end which are operatively engaged by a spring loaded detent 220. A drain or fluid return passage 222 is provided in this spool at the right end thereof which is in open communication with the surface of the central land 212 via a pair of cross ports 224.

The interlock valve 180 is of relatively simple construction, embodying a pair of cylindrical lands 226 and 228, a central annulus or neck 230. A reduced diameter extension 232 is at the right end thereof and a spring-receiving cavity 234 is formed at the left end when viewing the drawing.

In a similar manner the shuttle valve 182 has a central annulus or neck 236 with a pair of lands 238 and 240 on the opposite sides thereof, an extension 242 at the left, and a spring-receiving cavity 244 on the right.

Turning now to the construction of the valve body 174 it is apparent that it has an upper bore 246, a central bore 248 and a lower bore 250 when viewing the drawing. The upper bore 246 receives the speed selector spool 176 and is interrupted by a plurality of annular grooves 252, 254, 256, 258, 260, 262, 264 and 266. In general, the groove 252 is a fluid inlet groove, the groove 254 is a fluid-draining groove in constant communication with a drain conduit 267, and the remainder respectively connect with the control passages 104, 106, 108, 110, 112 and 114 respectively.

The central bore 248 in the valve body 174 receives the neutral selector spool 178 and is interrupted by four annular grooves 268, 270, 272 and 274. The first groove 268 at the right is in constant communication with the first supply conduit 166 via a passage 276 so that pressure at a preselected value is continually available thereat. Further, the second groove 270 is continuously open to the first groove 252 in the upper bore 246.

The lower bore 250 not only has four annular grooves 278, 280, 282 and 284, but is provided with three serially arranged stop or blocking elements 286, 288 and 290 to divide the bore into two parts for individually receiving the interlock valve spool 180 and the shuttle valve spool 182. Thus, a spring 292 abuts the right stop element 286 and is seated in the cavity 244 to bias the shuttle valve spool 182 fully to the left, as shown, against the central stop element 288 in the absence of pressure in the annular groove 282. Similarly, a spring 294 abuts the left stop element 290 and is seated in the cavity 234 to bias the interlock valve spool fully to the right against the central stop element in the absence of pressure fluid in the annular groove 284.

More specifically, the groove 280 in the lower bore 250 serves as an inlet to variable pressure fluid communicating thereto via the second supply conduit 168 and from the first control system 150 described in connection with FIG. 1. Of note is the fact that the groove 280 is in constant communication with the groove 274 in the central bore 248 via a passage 296. On the other hand, the groove 278 serves as a return-to-drain outlet in one of the two positions of the neutral selector spool 178 as it is in continuous communication with the groove 272 in the central bore via a passage 298. Advantageously, the groove 278 is also in constant communication with an outlet conduit 300. This outlet conduit communicates a fluid signal to the groove 284 via a branch signal passage or conduit 302, and fluid flow to an interlock detent mechanism 304 shown in the lower right corner of FIG. 3.

In substance, the interlock detent mechanism 304 advantageously prevents movement of the directional control system 156 and, particularly the movement of a forward and reverse shifter bar 306 when the input clutch 26 is engaged. This shifter bar is mechanically movable into three axially spaced positions corresponding to forward (F), neutral (N) and reverse (R) in response to manual movement of the directional selector lever 158. With such bar movement the shifter collar 84 is moved by a shifter fork 308 connected to the bar to enable selective coupling thereof to either of the reverse or forward output gears 78 or 82 previously described in connection with FIG. 1. The right end of the shifter bar is provided with annular detent notches 310 corresponding to the three positions, and is received in a bore 312 in a valve body 314 of the detent mechanism 304. Another bore 316 formed in the valve body and appropriately blocked at its rightward end when viewing the drawing is of a construction to receive an interlock valve spool 318. An annular outlet groove 320 opens on the bore and is in open communication with the outlet conduit 300 from the second control system 154 only when the valve spool is moved to the right from the position illustrated. This outlet groove is significantly connected to a passage 324 leading to the input clutch actuating piston 28 described with respect to FIG. 1 for engaging the input clutch 26. It is apparent that the interlock valve spool 318 has two lands 326 and 328 as well as two reduced diameter portions 330 and 332, and that a spring 334 biases the spool fully to the left to the position shown in the absence of sufficient pressure in the conduit 300 leading to the left end of the spool. In such position a detent 336 is allowed to be freely displaced by any movement of the shifter bar 306 because the detent is in alignment with the reduced diameter portion 332 of the spool.

Turning attention now to the construction of the speed selector mechanism 146 in FIG. 3, it is apparent that the speed selector lever 148 is universally mounted for movement on a console 338 and is guided in a preselected gear shift pattern by a guide plate 340 on the console. Movement of the lever in a forward direction or upwardly to the left will allow a neutral condition of the transmission 18 to be effected, while movement in an aft direction or to the right will align the lever with a selected one of the six speed conditions. Subsequent movement of the lever downwardly and to the left into a particular speed slot will enable the gear shift to be completed as will subsequently be described.

More particularly, the speed selector mechanism 146 includes a trunnion mounting generally identified by the reference numeral 342. Such mounting has a trunnion element 344 pivotally rockable about a shaft 346 secured to the console 338. The trunnion element has an arm 348 which is pivotally attached to a neutral spool rod assembly 350; such rod assembly being partially diagrammatically illustrated for convenience and being connected to the neutral selector spool 178. A pair of upstanding arms 352 on the trunnion element support a cross shaft 354, on which is pivotally mounted an element 356. The element 356 is secured to the bottom of the speed selector lever 148 and has an outstanding arm 358 which is pivotally secured to a speed spool rod assembly 360 connected to the speed selector spool 178.

OPERATION

With the speed selector lever 148 in a neutral position in the guide plate 340 as shown in solid lines in FIG. 3, and with the input clutch control lever 152 in its fully disengaged position, the speed selector spool 176 and the neutral selector spool 178 assume their full rightward positions as illustrated in FIG. 4. In such circumstances the first control system 150 provides no pressure fluid to the second supply conduit 168. Although the first control system does provide fluid to the first supply conduit 166 and to the passage 276, it is to be noted that it is blocked by the neutral selector spool at the groove 268.

In general, moving the speed selector lever 148 from the solid line position downwardly and to the left when viewing FIG. 3 from the main pathway of the guide plate 340 causes corresponding incremental movement of the neutral selector spool 178 to the left. Particularly, the lever 148, the element 356, and the trunnion element 344 rock as a unit in a common plane about the shaft 346. This causes the arm 348 to move downwardly, whereupon the neutral spool rod assembly 350 causes leftward displacement of the neutral selector spool when viewing FIG. 4. In such instance the detent 220 aligns with the detent notch 218 for positive positioning of the spool. Pressurized fluid at the annular groove 268 is no longer blocked since the inlet annulus 215 is then in open communication with the groove 270. This permits fluid flow to the groove 252 in the upper bore 246. In the neutral position of the speed selector spool 176 the flow of fluid continues via the first annulus 200 in the speed selector spool, the inlet cross ports 202, the central passage 198, the outlet cross ports 206, the annular groove 254 and to the drain conduit 267 so that no engagement of the speed shifting collars 64, 66 and 68 is affected.

Assuming next that the speed selector lever 148 is moved rearwardly or to the right when viewing FIG. 3 from the solid line position shown to a position opposite third gear as indicated by the arrow A. This action causes the lever, the element 356, and the arm 358 to move in a clockwise manner about the cross shaft 354. The speed spool rod assembly 360 coupled to the arm 358 moves correspondingly downward and the speed selector spool 176 moves three increments to the left, as may be visualized from FIG. 4, which precise movement is enhanced by the engagement of the detent 196 in the fourth detent notch 194 and as identified on the spool by the reference numeral 3. However, no fluid is available to the upper bore 246 because of the blocking position of the neutral selector spool 178 shown as previously described.

Subsequent movement of the speed selector lever 148 leftwardly and fully into the third speed slot in the guide plate 340 as indicated by the arrow B causes no movement of the speed selector spool 176 but leftward movement of the neutral selector spool 178 to permit fluid flow from the first supply conduit 166 to be no longer blocked from communication with the upper bore 246. Consequently, fluid flow is directed into the first annulus 200 of the speed selector spool, through the inlet cross ports 202, the central passage 198 and leftwardly and outwardly through the outlet cross ports 26. Since the outlet cross ports 206 are now in radial alignment with the third control passage 108, with the lands 186 and 188 of the spool blockingly contacting the upper bore 246 on either side thereof, fluid is caused to flow through the control passage 108 to the lower right actuating chamber 134 of the shifter mechanism 86 as shown in FIG. 2.

With pressure fluid available to the lower right actuating chamber 134 of the piston 122, the piston is urged to the left when viewing the drawing from its spring centered position whereupon it acts against the left plate 138 to compress the left spring 136. This causes corresponding movement of the shifter fork 140 and the third sliding collar 68 to splinably couple the driven gear 58 to the intermediate shaft 36. When the left shoulder 132 of the central land 128 abuts the stop element 118 the pressure fluid in the right actuated chamber is communicated to the common or branched signal transmitting passage 116 via the central bore 98. Because the other pistons 124 and 126 are simultaneously spring biased toward their central positions, they are disposed in a blocking relationship to the branched ends of the common passage 116 and have no influence thereon.

Thus, with the piston 122 located fully to the left when viewing FIG. 2, indicating that the driven gear 58 is coupled to the intermediate shaft 36, a signal is transmitted via the passage 116 to the second control system 154 in FIG. 4. Particularly, such signal is communicated to the groove 282 and the lower bore 250 where it acts against the shuttle valve spool 182 to move it fully to the right against the biasing action of the spring 292. This allows fluid communication between the second supply conduit 168 and the outlet conduit 300 via the groove 280, the lower bore, the neck 236 of the spool, and the groove 278. It is of note to appreciate that this outlet conduit is automatically depressurized via the groove 278, the passage 298, the groove 272, and through the cross ports 224 and the drain passage 222 any time that the neutral selector spool 178 is in the inactive position illustrated.

With the directional selector lever 158 in either the forward or reverse position the transmission 18 is fully actuated to transmit power by manually moving the input clutch control lever 152 in FIG. 3 from its disengaged position to its engaged position. This causes pressure fluid to be communicated by the first control system 150 to the second supply conduit 168 and past the shuttle valve spool 182 as just described to the outlet conduit 300. Since the outlet conduit is connected to the interlock detent mechanism 304 the interlock valve spool 318 is urged fully to the right against the force of the spring 334, permitting flow of pressure fluid via the bore 316, the outlet groove 320 and the passage 324 directly to the actuating piston 28 of the input clutch 26 shown in FIG. 1.

It is of major significance to note that the directional control system 156 at the lower portion of FIG. 3 is blocked, preventing any movement of the shifter bar 306 when the interlock valve spool 318 is in its rightward or pressure biased position. Particularly, under these conditions the detent 336 cannot move upwardly when viewing the drawing because the spool land 326 blocks it. As a result the detent remains in any one of the three detent notches preventing any further movement of the shifter fork 308. It can be released only by manual return of the input clutch control lever 152 and thus the input clutch 26 to its disengaged position.

It is also of substantial significance to recognize that the outlet conduit 300 is simultaneously connected to the other interlock valve spool 180 located at the lower left of FIG. 4. Pressure fluid in the outlet conduit is directed through the conduit 302 and the groove 284 into the lower bore 250 to bias the spool 180 leftwardly against the force of the spring 294. When this is done, the land 228 prevents any further downward movement of the detent 220 so that the neutral selector spool 178 can no longer be moved. This prevents any motion of the speed selector lever 148 until the input clutch control lever 152 is likewise moved to its disengaged position.

An upshift from third gear to fourth gear is accomplished in the following manner. Initially, the input clutch control lever 152 must be disengaged, causing the first control system 150 to depressurize the second supply conduit 168 and consequently the outlet conduit 300. The absence of pressure in the conduit 300 also releases the pressure in the groove 284 to the interlock valve spool 180 allowing the spring 294 to return the spool to the right. This allows the neck 230 of the spool to align with the detent 220 so that the neutral selector spool 178 may thereafter be shifted. The operator then can move the speed selector lever 148 to the right out of the third gear slot in the guide plate 340 causing the neutral selector spool to move to the right and shutting off flow of fluid from the first supply conduit 166 at the middle bore 248 by the placement of the land 212 as shown. Movement of the speed selector lever to a position opposite the fourth gear slot in the guide plate subsequently radially aligns the third annulus 204 of the speed selector spool 176 with the control passage 110. The control passage 108 is thereby connected to the drain conduit 267 via the upper bore 246 and the second annulus 208 in the spool. When this occurs the right actuating chamber 134 in the shifter mechanism 86 of FIG. 2 is depressurized, permitting the springs 134 to center the piston 122 and to thereby automatically return the third sliding collar 68 to a central position through corresponding movement of the shifter fork 140. The signal transmitting passage is likewise depressurized and blocked by this action, whereupon the shuttle valve spool 182 in FIG. 4 is returned to the left by the spring 292. Further manual movement of the speed selector lever 148 fully into the fourth gear slots causes corresponding movement of the neutral selector spool 178 to the left to permit the first supply conduit 166 to supply pressure fluid through the speed selector spool to the control passage 110 and to the lower left actuating chamber 134 in FIG. 2. This moves the piston 122 to the right for engagement of the sliding collar 68 with driven gear 60 to effect a fourth gear speed ratio.

Upon reaching the fully shifted position of the piston 122, the signal transmitting passage 116 is again pressurized to bias the shuttle valve spool 182 in FIG. 4 to the right. Thereafter, the input clutch control lever 152 is manually moved to its engaged position pressurizing the second supply conduit 168 and the outlet conduit 300 through the displaced shuttle valve spool. This simultaneously places the interlock valve spool 180 in a position blocking movement of the detent 220 and preventing movement of the neutral selector spool 178 and associated control lever 148, and places the interlock valve spool 318 in FIG. 3 in a position blocking movement of the detent 336 and preventing movement of the shifter bar 306 and associated control lever 158.

Thus, it is apparent that transmission control assembly 8 provides an improved construction for shifting a constant mesh transmission 18 into six forward or reverse speeds, and which includes a hydraulically actuated shifter fork mechanism 86 which is not only simple and reliable in operation but also is of a construction for sequentially advising the control assembly via the signal transmitting passage 116 when the sliding collars 64, 66 and 68 are fully engaged. It is only after full sliding collar engagement and positive coupling of the gears that the input clutch 26 can be engaged so that the service life of the transmission can be significantly extended. Moreover, the assembly is efficiently integrated with a directional control system 156 including a mechanically actuated shifter fork 308.

Furthermore, the transmission control assembly 8 has two integrated interlock valve spools 180 and 318 which prevent inadvertent movement of either the speed selector lever 148 or the directional selector lever 158 whenever the input clutch 26 is engaged. Only by disengaging the input clutch control lever 152 can the interlock valve spools be released from their detent blocking positions.

Other aspects, object, and advantages of the present invention will become apparent from a study of the specification, drawings, and appended claims.

The embodiment of the invention in which an exclusive property or privilege is claimed are defined as follows:

1. A transmission control assembly for a transmission having a fluid engaged and spring disengaged input clutch movable between an engaged position and a disengaged position, a plurality of gears downstream of the clutch, a shaft, and a plurality of sliding collars selectively coupling said gears to said shaft, the control assembly comprising:

input clutch control means including a manually operated input clutch control member movable between a first position and a second position for respectively selecting said engaged and disengaged positions of said input clutch;

shift control means for fluid power engagement of one of said sliding collars into an active position connecting one of said gears to said shaft, said shift control means including a manually operated speed control member movable between a plurality of speed positions;

interlock control means for automatically preventing movement of said speed control member between said speed positions until said input clutch control member is at said second position; and blocking means for holding said input clutch in said disengaged position until said one of said sliding collars is at said active position, said blocking means including a shuttle valve movable between a first position and a second position and means for supplying fluid to said shuttle valve for moving said shuttle valve to said second position in response to movement of said one of said sliding collars to said active position.

2. The transmission control assembly of claim 1 wherein said interlock control means includes an interlock valve movable between an active blocking position and an inactive release position with respect to said speed control member, said input clutch control means being of a construction sufficient for directing fluid to said interlock valve, and moving said interlock valve to said blocking position with said input clutch control member at said first position and said shuttle valve at said second position.

3. The transmission control assembly of claim 2 wherein said transmission has a driven forward gear, a driven reverse gear, an output shaft, and a directional control member, said directional control member being movable between a first position at which said forward gear is connected to said output shaft and a second position at which said reverse gear is connected to said output shaft, said interlock control means including a second interlock valve movable between an active blocking position and an inactive released position with respect to said directional control member, said input clutch control means being of a construction sufficient for directing fluid to said second interlock valve, moving said second interlock valve to said blocking position with said input clutch control member at said first position and said shuttle valve at said second position.

4. The transmission control assembly of claim 2 wherein said shift control means includes a housing, two bores in said housing, a speed selector spool in one of said bores, and a neutral selector spool in the other one of said bores, said speed control member being connected to said speed selector spool and said neutral selector spool.

5. A transmission control assembly for a transmission having an input clutch movable between an engaged position and a disengaged position, a plurality of gears downstream of the clutch, a shaft, and a plurality of sliding collars selectively coupling said gears to said shaft, the control assembly comprising:

input clutch control means including a first control member movable between first and second positions for respectively selecting said engaged and disengaged positions of said input clutch;

shift control means including a second control member movable between a plurality of positions for positioning one of said sliding collars into an active position connecting one of said gears to said shaft; and blocking means for maintaining said input clutch control means in said disengaged position until one of said sliding collars is at said active position, said blocking means including a shuttle valve movable between a first position and a second position and means for supplying fluid to said shuttle valve for moving said shuttle valve to said second position in response to movement of said one of said sliding collars to said active position.

6. The transmission control assembly of claim 5 including interlock control means for automatically preventing movement of said second control member between said positions until said first control member is at said second position.

7. The transmission control assembly of claim 6 wherein said interlock control means includes an interlock valve movable between an active blocking position and an inactive release position with respect to said second control member.

8. The transmission control assembly of claim 7 wherein said interlock control means includes a spring loaded detent member, and said interlock valve is of a construction sufficient for blocking movement of said detent member at said active blocking position and for permitting movement of said detent member at said inactive release position.

* * * * *